Figure 3:
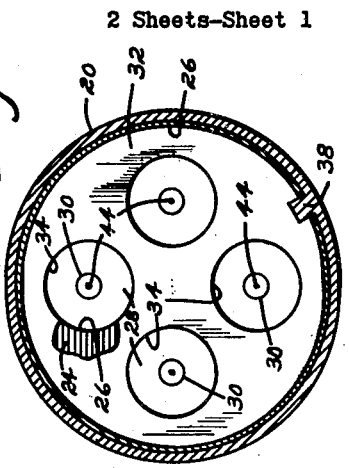

June 27, 1950  G. HERZOG ET AL  2,512,773
RADIOACTIVE MEASURING
Filed July 12, 1946  2 Sheets-Sheet 1

INVENTORS
ALLEN D. GARRISON
GERHARD HERZOG
BY
ATTORNEY

June 27, 1950 G. HERZOG ET AL 2,512,773
RADIOACTIVE MEASURING
Filed July 12, 1946 2 Sheets-Sheet 2
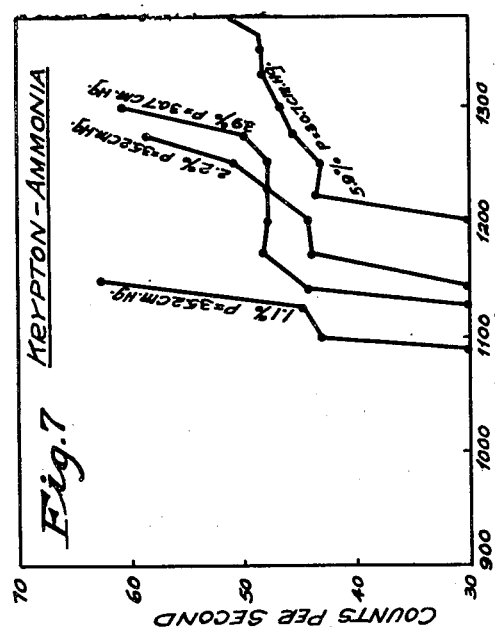
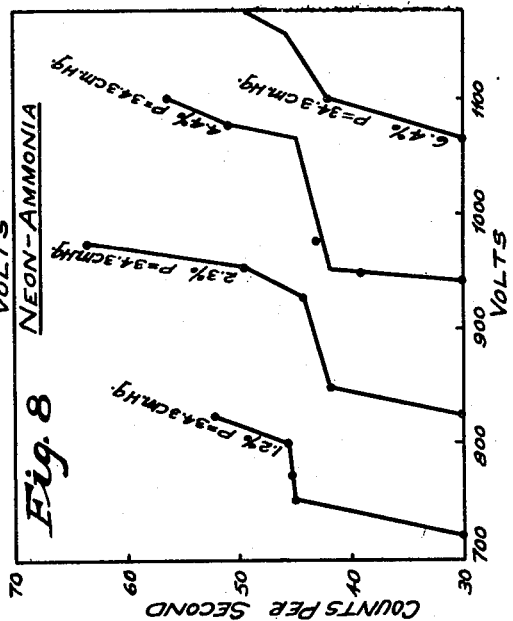
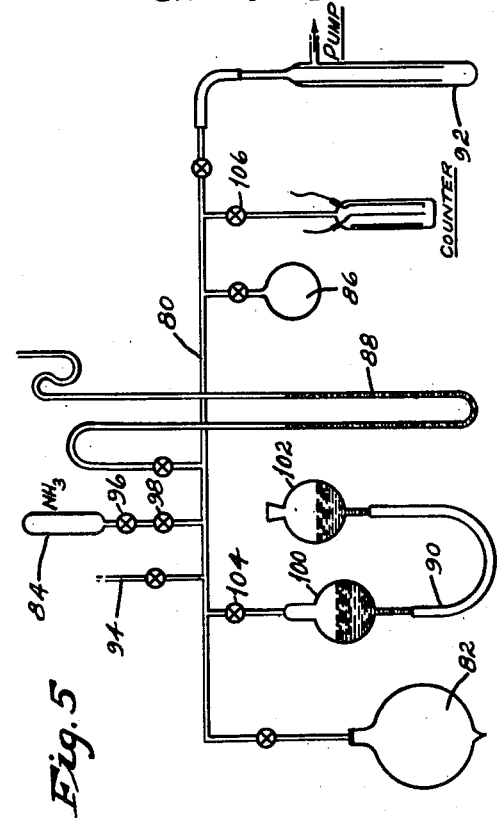
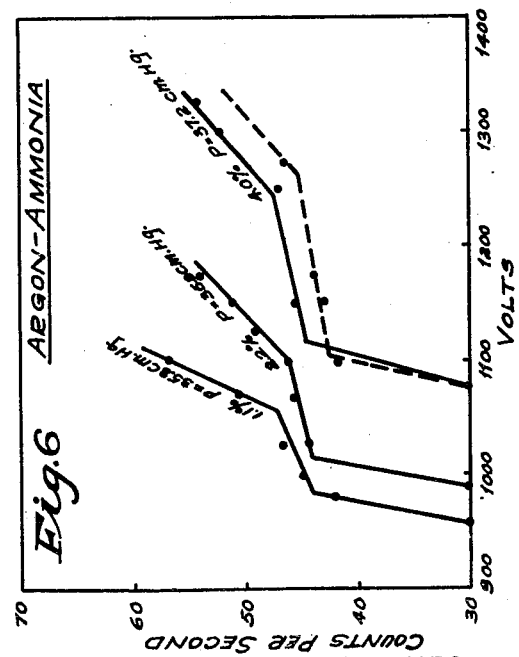
INVENTORS
ALLEN D. GARRISON
GERHARD HERZOG
BY
ATTORNEY Patented June 27, 1950

2,512,773

UNITED STATES PATENT OFFICE 2,512,773

RADIOACTIVE MEASURING

Gerhard Herzog and Allen D. Garrison, Houston, Tex., assignors to Texaco Development Corporation, New York, N. Y., a corporation of Delaware Application July 12, 1946, Serial No. 683,066

6 Claims. (Cl. 250—27.5)

This invention relates to the detecting and measuring of penetrative radiation and more particularly to a device of the counter type for measuring the intensity of such radiation as gamma rays.

The principal object of the invention is the provision of a device of this type which will have an efficiency much higher than the conventional Geiger-Mueller counter, which will be rugged and stable in operation and which will have a substantially unlimited life time.

In making intensity measurements of such radiation as gamma rays, the Geiger-Mueller counter has been used frequently in the past. The common Geiger-Mueller counter usually comprises a cylinder of metal forming a cathode sealed within a glass envelope or casing and through the center of which cylinder is disposed a fine wire forming the anode. The envelope usually contains a suitable gas at a subatmospheric pressure and the device is connected in an electrical circuit so that the anode wire is maintained at a positive potential with respect to the cylindrical cathode. Normally the potential difference between the cathode and the anode is nearly, but not quite, high enough to cause a discharge to take place; however, if a particle or ray capable of ionizing the gas passes into the detector, ionization of the gas will take place and a discharge will occur. The output of the device is usually led to a suitable amplifier and then to a recording instrument capable of registering the number of discharges of the counter. This type of radiation intensity measuring instrument is useful in many instances, but for detecting the presence of gamma rays it has a fairly low efficiency.

This application is a continuation-in-part of our copending application Serial No. 608,040 filed July 31, 1945, now abandoned.

In accordance with the present invention a radiation detecting device or counter is formed of at least one and preferably several conducting cathode plates or sheets, in which one or more holes have been formed to allow the passage of fine anode wires extending substantially at right angles to the plates. The plates are arranged parallel to each other and separated a relatively small distance and are so oriented that the holes in the plate bank are in substantial alignment so that an anode wire disposed through the center of each series of holes will provide the proper electrical field concentration. The assembly comprising the cathode and the anode is housed in a metal casing which is filled with a gas or rather a gaseous mixture containing argon, neon or krypton and a small amount of anhydrous ammonia at a pressure slightly below atmospheric. As will be explained more fully hereinafter, a counter of the Geiger-Mueller or other type when filled with such a gaseous mixture has a substantially unlimited lifetime and when the filling is used in the improved form of counter to be described, the resulting instrument is also much more efficient than those used heretofore.

Figure 4:
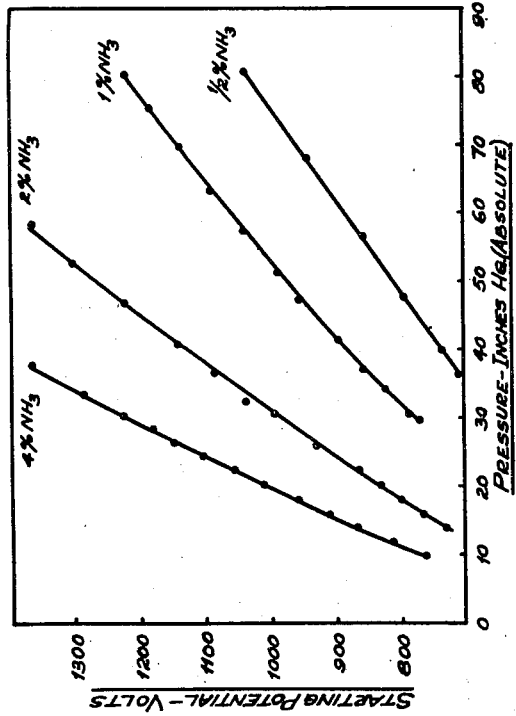
Figure 1:
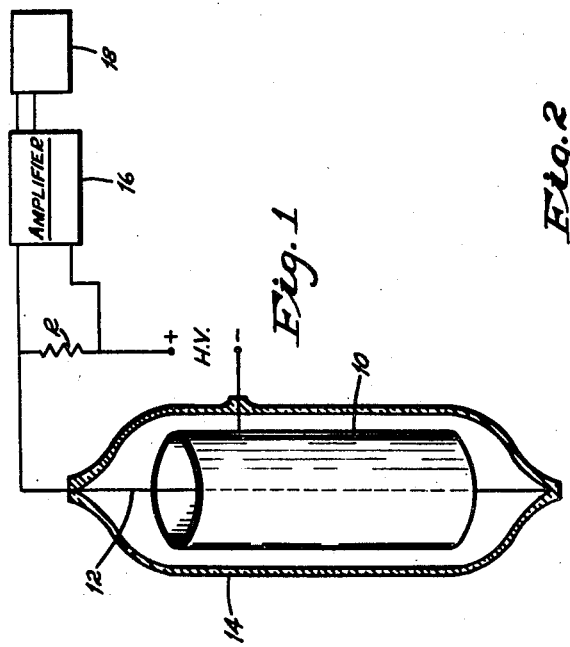
Figure 2:
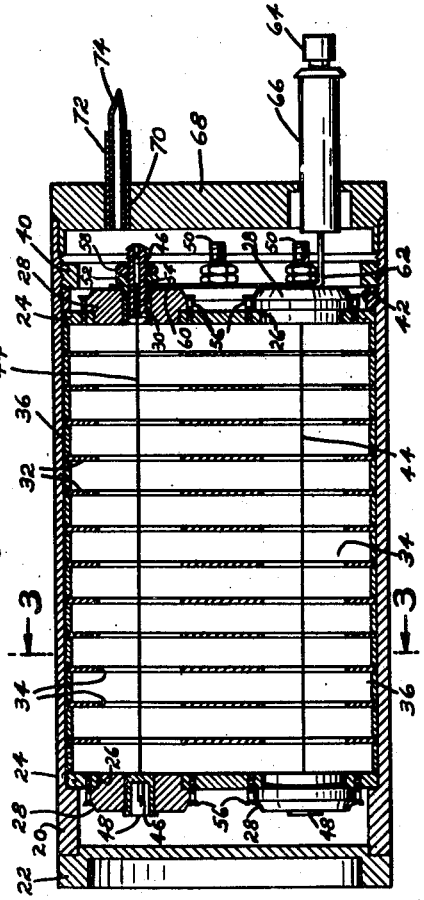

For a better understanding of the invention reference may be had to the accompanying drawing in which:

Figure 1 is a diagrammatic view of a Geiger-Mueller counter of the conventional type, Figure 2 is a vertical, sectional elevation through a counter of an improved type, Figure 3 is an elevation through the counter on the line 3—3 of Figure 2 looking in the direction of the arrows, Figure 4 is a curve showing the pressure-starting potential characteristics of a counter such as is shown in Figures 2 and 3 and which is filled with argon and anhydrous ammonia in various proportions, Figure 5 is a diagrammatic sketch of apparatus for mixing the gases and filling the counters, and Figures 6, 7 and 8 are curves showing results when using mixtures of argon, krypton or neon and ammonia in various percentages.

The conventional Geiger-Mueller counter shown in Figure 1 consists of a thin walled, metal tube or cylinder 10 with a very thin wire comprising the anode 12 spanned axially and insulated from the cathode cylinder. These electrodes are disposed in an envelope 14, commonly a glass tube, which contains a gas, e. g. hydrogen at a fairly low pressure, say, 5–10 cm. of mercury. A central wire 12 is maintained at a positive potential with respect to the cylinder and a fairly high resistance R is placed in the circuit. Normally, the potential difference between the cathode 10 and the wire 12 is nearly, but not quite, high enough to cause an electrical discharge to take place. If an ionizing ray passes into the detector a discharge may take place with a current flow of the order of a few microamperes and this causes a large voltage drop across the resistance R. The discharge will cease after a very short period of time. By amplifying the sudden voltage drop across R in a suitable amplifier 16, a mechanical recorder or other device 18 capable of registering the discharges of the counter may be actuated. After the discharge has ceased, the counter should again be in condition to register the passage of another ionizing ray.

Although the improved form of radiation detector to be described is in some ways similar to the Geiger-Mueller counter it differs quite radically in other respects. With reference to Figures 2 and 3, the housing or casing is formed of a metal cylinder or tube 20 of a material such as brass. It has been found that a detector of about three inches outside diameter will fit conveniently into well logging electrodes or capsules of 4¼ inch outside diameter. The length of the detector housing depends, of course, on the conditions for which the instrument is to be used. For purposes of well logging a single detector may be several feet in length. Where the detectors embodying the invention are to be used in measuring instruments such, for instance, as the thickness measuring instrument shown in the U. S. Letters Patent to D. G. C. Hare No. 2,277,756, or in the copending application of Herzog et al., Serial No. 574,870, filed January 27, 1945, the detector may be from one to two inches in diameter and from, say, two to four inches in length.

As shown in Figure 2, the left hand end of the casing 20 is closed by means of a cover member 22. Disposed near the opposite ends of the casing 20 are a pair of discs 24, each disc containing a plurality of holes 26, in this instance shown as four in number, each hole being occupied by an insulating plug or button 28 containing a center hole 30. Between the discs 24 are a plurality of thin disc-shaped sheets or plates 32 of a suitable metal such as brass or lead, each plate being provided with a number of holes 34 of the same size and number as the holes 26 in the discs 24. The cathode plates 32 are held in separated relation by means of spacer rings 36. A projection or key 38 shown in Figure 3 is disposed longitudinally along the inner surface of the housing 20, and the discs 24, the cathode plates 32 and the spacer rings 36 are provided with cut-out portions fitting over this key so that the parts mentioned will be maintained with the several series of holes 26 in alignment. An externally threaded ring 40 cooperating with threads on the right hand end of the housing 20 is adapted to be forced against a spacer ring 42 so as to squeeze the discs 24, cathode plates 32 and spacer rings 36 tightly together. Through each series of holes 34 an anode wire 44 is disposed, the left hand end of each wire being provided with an enlargement 46 adapted to be housed within and to bear against the bottom of a cup 48 fitting within the hole 30 in an insulator button 28. The other end of each anode wire is also provided with an enlargement 46 housed within an externally threaded elongated cup or hollow bolt 50 adapted to be screwed into a cup member 52 fitting within a hole 30 in an insulator button 28. Between the enlargement 46 at the right hand end of each anode wire and the bottom of each cup 50 is a small spring 54. The insulator buttons 28 are held in place by the heads of screws 56 attached to the discs 24.

A predetermined tension is maintained on each anode wire 44, and this tension being placed on the wire in the following manner: The parts are assembled substantially as shown in Figure 2 and a cup or hollow bolt 50 is engaged by a suitable tool and pulled toward the right until the wire 44 is under the desired tension which can be measured by any suitable means. The cup 50 is held in that position while the outer cup 52 is screwed to the left until its enlarged head engages the insulating button 28 whereupon a lock nut 58 is tightened on the cup 50. The wire 44 will then remain under the desired tension and the other anode wires are placed under tension in the same manner. A thin metallic disc 60 having holes corresponding to the position of the holes 30 in the insulating buttons is placed so that it will be engaged by the heads of the cups 52 and a wire 62 is soldered at one end to this connecting plate 60 and its other end to a metal cap 64 on the outer end of an insulating bushing 66 secured to the right hand closure plate 68 which may be attached to the end of the housing as by soldering or welding. The end plate 68 is also provided with an opening 70 containing a sleeve 72 in which is mounted a small tube 74 through which the interior of the counter can be filled, as will be described more fully hereinafter, with a gaseous mixture consisting of commercially pure argon, neon or krypton and a small amount of anhydrous ammonia at a pressure of about 27 inches Hg. After the gaseous filling is placed in the counter the end of the tube 74 is crimped so as to seal the interior of the counter.

If it is desired to simplify the construction somewhat, the discs or plates 24 and the insulating plugs or buttons 28 can be replaced by a pair of discs or plates of electrically insulating material. It has been found that a sintered material consisting of glass and mica called "Mycalex" is satisfactory for this purpose and is obtainable in sheet form. If the plates 24 are made of such a material, it is necessary merely to drill holes in the plates for accommodating the cup shaped members 48 and 52. This simplification also has certain advantages. It is somewhat difficult to obtain the insulating plugs 28 having sufficiently close tolerances for the outside and inside diameters to provide for the proper centering of the anode wires 44. Furthermore, the weight of the insulating buttons is supported by the wires 44 whereas when the plates 24 are made of an insulating material, the buttons 28 can be dispensed with entirely.

Gamma ray counters have been designed which contain fillings of argon and petroleum ether. This filling has been found very satisfactory but it has been noted that the life time of these counters is somewhat limited. It is believed that this is due to a change in the gas under the electrical discharges of the counter. Such a change may be caused either by the formation of free carbon or the building up or breaking down of the hydrocarbon molecules. It has been found in certain tests that the life time of these counters when used with quench circuits of the Neher type, varied from 50 to 800 hours at a counting rate of about 1,000 per second. Furthermore, the starting potentials for these counters increased during the life of the counters by 50 to 200 volts.

Our experiments have shown that where the counters of the type described are filled with commercially pure argon, neon or krypton containing from 0.1% to 10% of anhydrous ammonia the life time is substantially unlimited, and it is believed that this is due to the fact that under the electrical discharges the ammonia molecules are split up into nitrogen and hydrogen. These substances then can recombine to ammonia and it is therefore to be expected that a state of equilibrium will be reached by the nitrogen, ammonia and hydrogen so that no other molecules can be formed. In a counter filled with a gas such as argon, neon or krypton and anhydrous ammonia two variables must be considered, namely the total gas pressure and the percentage of ammonia contained in the mixture. The qualities of the counter in which one is interested are the starting potential, the length of the plateau and the efficiency, and it has been found that counters filled with commercially pure argon, neon or krypton and about 2% anhydrous ammonia at substantially atmospheric pressure, in addition to having substantially unlimited life times, provide plateaus which are substantially as good as those obtained with any other gaseous mixture and which have a starting potential of approximately 1,000 volts, and also that these counters have as high an efficiency as the counters filled with argon and petroleum ether.

In order to determine the life time of counters containing fillings of argon-petroleum ether and argon-ammonia, a "concentrated" life time test was conducted. A voltage was applied to the counters which was far above the end of the plateau and under such conditions the counters went into continuous discharge. This procedure is detrimental to counters filled with argon and petroleum ether since after the abnormally high voltage had been applied for no more than five minutes and then reduced to the normal operating value, the counter completely lost its plateau. However, the same procedure applied to counters filled with commercially pure argon and anhydrous ammonia was not harmful at all. In one case the abnormal voltage was left on the counter for 20 hours and the counter sparked continuously throughout that time but when the voltage was reduced to its normal operating value the counter operated as well as it did before the abnormally high voltage was applied. This indicates that the supposed disintegration of the gas does not occur when the argon-ammonia filling is used.

Figure 4 is a curve or rather a series of curves made on a particular counter showing the relationship between the starting potential and the total pressure of the gas filling for ammonia-argon ratios of ½, 1, 2 and 4%. It will be noted that the starting potential increases approximately linearly with the pressure and the slope of the curves increases with increasing ammonia content. It was found in studying the plateau width for these mixtures that the best results were obtained with a mixture containing 98% argon and 2% ammonia. It will be noted from Figure 4 that with this filling a pressure of 27 inches of mercury was necessary where the starting potential was 950 volts.

Prior to filling a counter all grease is removed from the various parts preferably by means of a suitable solvent such as carbon tetrachloride. The counter is then evacuated while being heated to approximately 100° C. from one-half hour to several hours. During this evacuation process occluded gas is removed from the various parts. Flushing the counter several times with argon dilutes any remaining foreign gas. After cooling, the counter is then preferably filled with anhydrous ammonia alone which is caused to remain in the counter from 15 to 30 minutes. During this time an equilibrium condition is obtained between the ammonia and the metal surfaces. The counter is then evacuated, the gas mixture is then introduced as will be described hereinafter and the counter sealed.

The relationship of the starting potential, the width of the plateau, the pressure of the gas mixture and the percentage of ammonia in the mixture will vary somewhat with the construction and dimensions of the counter and for each type of construction and application the most suitable values will be chosen. For example, one can obtain a relatively lower starting potential by sacrificing somewhat on the width of the plateau.

Although argon has been mentioned specifically, tests have shown that neon or krypton when mixed with anhydrous ammonia are substantially as satisfactory as argon in providing fillings with which a counter will show a reasonably flat plateau over a sufficient voltage range.

Due to the rather high costs of some of the rare gases a special system for the mixing of the gases and the filling of the counter was built. A diagrammatic sketch of the arrangement is shown in Figure 5 of which the whole system was built from Pyrex glass. It consists of a horizontal main line 80 to which are attached through stopcocks: the container 82 of the rare gas, a container 84 for ammonia, a storage container 86, a mercury manometer 88, a mercury pump 90, and a vacuum pump with a freezing trap 92.

The rare gases are obtainable in Pyrex flasks which have a double seal. The outer tubing of this seal is first welded on to the glass system. Then the inner seal which is drawn out to a fine point is broken by dropping a steel ball onto the point. This ball can be raised inside the tube with a magnet and it then is dropped onto the point.

The container for the ammonia is first evacuated and it is then filled through the inlet 94 out of a commercially obtainable steel flask which contains anhydrous ammonia. The container for ammonia is connected to the filling system through two stopcocks 96 and 98. By opening the stopcock 96 the small volume between the two stopcocks is filled with ammonia. Then the stopcock 96 is closed and the other stopcock 98 is opened and this small volume is admitted to the filling system. In this manner small amounts of ammonia can easily be transferred. The storage container is provided in order to store the ammonia rare gas mixtures.

The mercury pump 90 consists of two glass containers 100 and 102 which are connected by a rubber tubing. The stationary container 100 is connected through a stopcock 104 with the filling system. The other container 102 can be moved freely up and down whereby the mercury can be transferred from one container into the other and this arrangement can be used as a pump.

In mixing the gases and filling a counter the whole system is first evacuated. Then with the storage container 86 closed off and the mercury in the pump completely filling the stationary vessel 100, gas from the pure gas supply vessel 82 is admitted to a pressure which can be read on the manometer 88. Then the ammonia is admitted and its amount can be measured from the increase in pressure. The next step consists in thoroughly mixing the ammonia and the pure gas which is done by sucking the gases into the stationary bulb 100 by lowering the bulb 102. The gas mixture in the bulb is then pressed back into the glass system by lifting the movable bulb 102 and this procedure is repeated several times whereby the gases are moved back and forth through the system and a homogeneous mixture is obtained in a rather short time. If this were not done the gases would mix only due to diffusion and this would take several hours. After the gases have been mixed the valve 106 is opened and the counter filled.

A suitable multivibrator circuit is used as a preamplifier. The pulses from the counter go through a scale of 16 and are then registered with an electrical counter and timed with a stop watch.

For all measurements the time for 1600 counts was observed and from this the counting rate per second is derived. The statistical error for 1600 counts is 1600±40 or ±2.5%. The average counting rates are 45 counts per second, and the observed rates therefor have a statistical error of $$\pm \frac{45 \times 2.5}{100} = \pm 1.1$$

counts per second.

A radium source containing approximately 6 micrograms of radium was placed at a constant distance of 4¼ inches from the axis of the counter.

The results of several tests are plotted on the graphs of Figures 6 and 8. For various fillings the counting rate in counts per second versus the voltage is given.

In order to check the equipment and to obtain the data for comparison mixtures of argon and ammonia were first used and the results are shown in Figure 6. The various curves relate to percentages of ammonia as indicated on the curves. On each curve is further given the total pressure of the mixture in centimeters of mercury column. The flatness and the width of the plateau increases with an increase in ammonia and at the same time the starting potential increases (the starting potential is the point which is plotted on the axis, that is, at a level of 30 counts per second). The 4% curve was repeated after the counter was allowed to stand for 24 hours and is shown as a dotted line. This was done in order to see whether the above described mixing procedure is satisfactory. It can be seen that the curve changed only very little from that taken immediately after the filling.

The results for krypton are plotted in Figure 7 which is comparable to Figure 6 for argon. The plateaus are quite substantial and their quality improves with increased amounts of ammonia. For the same total pressure and ammonia concentration the starting potential with krypton is approximately 150 volts higher than for argon. In order to reduce the starting and the operating voltage of the counter, lower total pressures must be used with krypton than with argon.

The results for neon are given in Figure 8 showing curves with pressures comparable to those used with argon. The starting potential for equal pressure and ammonia concentration is approximately 190 volts lower for neon than for argon.

Although a radiation detector of the multiple-plate counter type has been described in detail, it is to be understood that a gaseous filling comprising commercially pure argon, neon or krypton and anhydrous ammonia can likewise be used to advantage in radiation detectors of other types.

Obviously many modifications and variations of the invention, as hereinbefore set forth, may be made without departing from the spirit and scope thereof, but only such limitations should be imposed as are indicated in the appended claims.

We claim:

1. A radiation detecting device comprising a sealed casing, a cathode member and an anode member within the casing and adapted to be connected to a source of high potential, and a gaseous filling within the casing, said filling consisting of a rare gas selected from the group consisting of argon, neon and krypton containing from 0.1% to 10% of anhydrous ammonia.

2. A radiation detecting device comprising a sealed casing, a cathode member and an anode member within the casing and adapted to be connected to a source of high potential, and a gaseous filling within the casing, said filling comprising a mixture of substantially 2% anhydrous ammonia and 98% a rare gas selected from the group consisting of argon, neon and krypton, said mixture being at a pressure not exceeding atmospheric.

3. A device for detaching gamma radiation comprising a housing, a plurality of plates in said housing arranged in a parallel bank and connected together electrically to form a cathode, the plates being separated slightly to form spaces therebetween and said bank of plates being provided with a plurality of holes disposed in parallel lines extending transversely through said bank, an anode wire extending through the center of each line of holes, said wires forming an anode, and a gaseous filling in said housing, said filling consisting of commercially pure argon containing from 0.1% to 10% of anhydrous ammonia.

4. A radiation detecting device comprising a closed housing, a plurality of metal sheets disposed in a bank in said housing in parallel, separated relation and connected together electrically to form a cathode, said bank of sheets being provided with a plurality of series of holes, the holes in each series being in alignment, an anode formed of a plurality of fine wires, each wire being disposed on the longitudinal axis of a series of said holes, and a gas filling in said housing, said gas being composed of a mixture of substantially 98% commercially pure argon and 2% anhydrous ammonia at a pressure of substantially 27 inches of mercury.

5. A radiation detecting device comprising a sealed casing, a cathode member and an anode member within the casing adapted to be connected to a source of high potential, and a gaseous filling within the casing, said filling consisting of commercially pure argon containing from 0.1% to 10% of anhydrous ammonia at a pressure slightly below atmospheric.

6. A gamma ray detecting device comprising a sealed casing, a cathode member and an anode member within said casing and adapted to be connected to a source of high potential, said anode member comprising at least one wire disposed in proximity to said cathode member so as to provide a concentration of the electrical field, and a gaseous filling within said casing consisting of commercially pure argon containing from 0.1% to 10% of anhydrous ammonia at a subatmospheric pressure.

GERHARD HERZOG.
ALLEN D. GARRISON.

REFERENCES CITED

The following references are of record in the file of this patent:

UNITED STATES PATENTS

| Number | Name | Date |
|---|---|---|
| 2,397,071 | Hare | Mar. 19, 1946 |

OTHER REFERENCES

Physical Review, vol. 65, May 1944, pp. 274–282.

Certificate of Correction

Patent No. 2,512,773                                                          June 27, 1950

GERHARD HERZOG ET AL.

It is hereby certified that error appears in the printed specification of the above numbered patent requiring correction as follows:

Column 8, line 14, for the word "detaching" read *detecting*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*